INVENTORS
H. W. KOGELNIK
C. V. SHANK

BY Francis E Morris

ATTORNEY

United States Patent Office

3,675,990
Patented July 11, 1972

3,675,990
REFLECTIVE-TYPE NARROW BAND FILTER
Herwig Werner Kogelnik, Fair Haven, and Charles Vernon Shank, Highlands, N.J., assignors to Bell Telephone Laboratories, Incorporated, Murray Hill and Berkeley Heights, N.J.
Filed June 16, 1970, Ser. No. 46,729
Int. Cl. H01s 3/10
U.S. Cl. 350—311                                 2 Claims

ABSTRACT OF THE DISCLOSURE

A thick transmission hologram is backed by reflective means to provide a narrow band filter or wavelength selector. Particularly advantageous are holograms with a diffraction efficiency of approximately 50 percent.

BACKGROUND OF THE INVENTION

This invention is a holographic device that operates as a narrow band filter or a wavelength selector.

A hologram is a recording of a set of interference fringes formed by interfering two phase-related beams of electromagnetic radiation. Typically, the recording is in the form of variations in transmittance or optical path length in a suitable recording medium. Such variable transmittance recordings are called absorption holograms while the variable optical path length recordings are called phase holograms.

The extent of the variation at a particular point on the recording medium depends on the intensity of radiation incident at that point; and because the intensity of the fringe pattern ordinarily varies sinusoidally, the variation in transmittance or optical path length is also sinusoidal. Because of this periodicity, a hologram can be regarded as comprised of a set of contours of maximum (or minimum) transmittance or optical path length separated by regions in which the transmittance or optical path length varies sinusoidally. The distance between adjacent contours of maximum transmittance or optical path length is the same as the fringe spacing.

If the thickness of the hologram is small in relation to the spacing of the interference fringes, the contours of maximum (or minimum) transmittance or optical path length are essentially lines on the recording medium; and the hologram can be regarded as a thin hologram. If, however, the thickness of the hologram is greater than the spacing of the interference fringes, the contours are essentially surfaces; and the depth of the hologram must ordinarily be taken into account. Such a hologram is termed a thick hologram or a volume hologram.

When a hologram is illuminated with a replica of one of the two beams that were used in forming the hologram, the illuminating beam is diffracted by the variation in transmittance or optical path length to reconstruct a replica of the other beam. In addition to this diffracted beam, there is also projected from the hologram a transmitted beam containing that part of the incident illuminating beam that is not diffracted by or absorbed by the hologram. When the diffracted beam emerges from the hologram on the side opposite that on which the illuminating beam was incident, the hologram is called a transmission hologram. When the diffracted beam emerges on the same side as the illuminating beam, the hologram is termed a reflection hologram.

If the hologram is a thin hologram, reconstruction is effected, in some instances, even if the illuminating beam is incident on the hologram at an angle that is quite different from the angle at which it was incident on the recording medium when the hologram was formed. If, however, the hologram is a thick hologram, the reconstruction process is governed by the Bragg condition that $\sin \theta_1 = n \cdot \sin \theta_2 = \lambda/2d$ where $\theta_1$ is the angle in air that both the illuminating beam and the diffracted beam make with the contours of maximum (or minimum) transmittance or optical path length, $\theta_2$ is the same angle in the recording medium, $n$ is the average refractive index of the recording medium, $\lambda$ is the wavelength of the Bragg-diffracted radiation in free space, and $d$ is the spacing between adjacent contours. Thus, if the wavelength of illuminating radiation and the spacing between adjacent contours are fixed, the second beam is reconstructed by diffraction only when the illuminating beam is incident on the contours at a particular angle. Alternatively, if the incident angle and the spacing between contours are fixed, the diffracted beam is formed only at a certain wavelength of incident radiation. As a result of these properties of angular selectivity and wavelength selectivity, thick holograms can be used to record several superimposed holograms, multicolor holograms, and holograms that can be reconstructed with white light.

SUMMARY OF THE INVENTION

It is an object of our invention to use the selectivity of a thick hologram as a wavelength selector.

It is a further object of our invention to utilize the combination of a thick hologram and reflective means to select from an incident beam of radiation a relatively narrow band of radiation that is returned in a direction antiparallel to the incident radiation.

It is still a further object of our invention to provide a tuning device for a broad band laser system.

These and other objects of our invention are achieved with a thick transmission hologram and reflective means that reflects back to the hologram both radiation transmitted by the hologram and radiation diffracted by it. For the most efficient return of radiation in the direction antiparallel to the incident direction, the hologram has a diffraction efficiency of approximately 50 percent.

BRIEF DESCRIPTION OF THE DRAWING

These and other elements, features, and objects of our invention will be more readily understood in the following detailed description of our invention taken in conjunction with the following drawing in which.

DETAILED DESCRIPTION OF THE DRAWING

Figure 1:
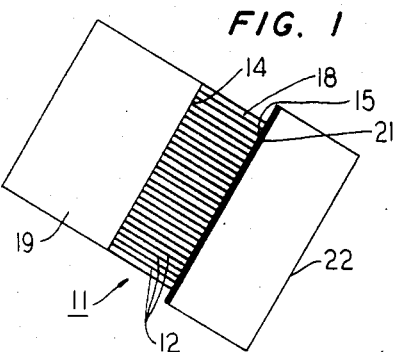
FIG. 1 is a schematic illustration of illustrative apparatus used to practice our invention.

In FIG. 1 there is shown an illustrative embodiment of our invention. It is comprised of a thick transmission hologram 11 backed by a reflective means 21, typically, a highly reflective metallic layer, mounted on a substrate 22. Hologram 11 is comprised of variations in optical path length in a suitable recording medium 18. Preferably, these variations are oriented so that contours 12 of maximum (or minimum) optical path length are substantially perpendicular to major surface 15 of hologram recording medium 18; and because surface 15 is ordinarily substantially parallel to an opposing major surface 14, contours 12 ordinarily are also substantially perpendicular to surface 14. Typically, the contours are flat surfaces parallel to one another and extending from surface 14 to surface 15. However, our invention can also be practiced with holograms in which the contours are not flat surfaces. For example, holograms with contours that are curved surfaces can be made by well-known methods to have imaging properties and such imaging properties can be used in our invention.

Illustratively, recording medium 18 is located on a transparent substrate 19 that supports the recording medium during the formation of the hologram and protects it during use. On the side of the hologram opposite the transparent substrate is the reflective means 21. Typically, this reflective means comprises a layer that is parallel to surface 15 and therefore perpendicular to contours 12; and the reflectance of this means is preferably as high as possible in order to avoid radiation losses.

Figure 2:
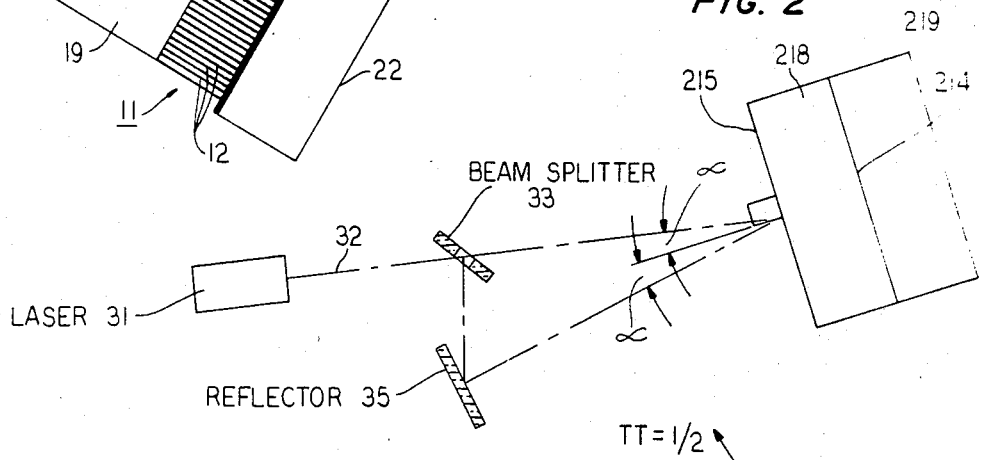
FIG. 2 is a schematic illustration of illustrative apparatus used to form the device of FIG. 1.

Illustrative apparatus for forming hologram 11 of FIG. 1 is shown in FIG. 2. This apparatus comprises a laser 31, a beam splitter 33, a reflector 35 and a recording medium 218 mounted on a transparent substrate 219. Recording medium 218 and transparent substrate 219 correspond to elements 18 and 19 of FIG. 1. Preferably, recording medium 218 is a transparent material such as dichromated gelatin in which a thick phase hologram can be recorded. Further details on dichromated gelatin can be found in the copending applications of T. A. Shankoff, Ser. No. 676,866, filed Oct. 20, 1967, and L. H. Lin, Ser. No. 717,207, filed Mar. 29, 1968, which are assigned to Bell Telephone Laboratories, Incorporated. Numerous other materials might also be used to record variations in optical path length in the recording medium, that is, variations in the refractive index or geometrical thickness, or both, of the medium. For example, the recording medium might be polymethyl methacrylate.

To form the hologram, a beam of light 32 is directed from laser 31 through beam splitter 33, where the beam is divided into two parts of approximately equal amplitude. With the aid of reflector 35 the two beams are directed at equal angles $\alpha$ onto recording medium 218 where they interfere. Preferably, the wavefronts of beam 32 are planar; and, as a result, the set of interference fringes that is formed in recording medium 218 is a set of parallel planes. Moreover, because the angle $\alpha$ between each beam and the normal to recording medium 218 is the same, the planes formed by the interference of the two beams are also normal to surface 215 of the recording medium.

As is well known, the spacing of the planes is dependent on the wavelenth of the two hologram forming beams and on the angle $\alpha$ between each of them and a normal to surface 215. In practicing our invention, we have formed holograms with collimated coherent radiation of 4416 A. wavelength derived from a helium-cadmium laser. The radiation was incident at $\alpha = \pm 30°$, $\pm 47°$, and $\pm 56°$, which resulted in fringes having 2300, 3300, and 3700 lines per millimeter, respectively, and spacings of 0.44, 0.33, and 0.27 micron, respectively.

After the hologram recording medium is exposed, the recording medium is developed if necessary. The resulting hologram then comprises a record of the fringe pattern in the form of variations in the optical path length in the hologram. Because of the way the hologram of FIG. 2 is formed, contours of maximum (or minimum) optical path length are oriented substantially perpendicular to major surface 215 of the hologram. The hologram is then combined with a reflective layer simply by squeezing the reflective layer against surface 215 of the hologram. As a result, a sandwich is formed as shown in FIG. 1, comprised of transparent substrate 19, hologram 11, reflective layer 21, and substrate 22 with the contours of maximum (or minimum) optical path lenth oriented substantially perpendicular to surface 15 and the reflective layer, If desired, this sandwich can be sealed so as to protect the hologram and the reflective layer from the ambient.

Figure 3:
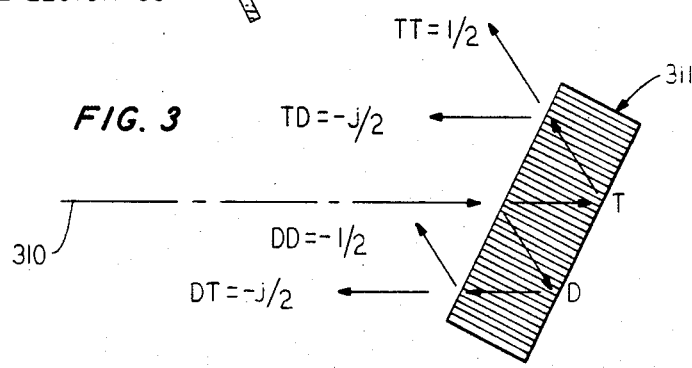
FIG. 3 is an illustration helpful in understanding the operation of the device of FIG. 1.

This combination of transmission hologram and reflective means can then be used as a reflection-type narrow band filter. The operation of this hologram filter and an appreciation of some of the variables in its design can be understood from FIG. 3 which depicts the effect of the filter, shown schematically as element 311, on a beam of incident radiation 310. A portion of the radiation incident on the hologram filter at the Bragg angle is diffracted to form a diffracted wave D, while another portion is transmitted to form a transmitted wave T. After reflection by the reflective layer, the diffraction process continues. From both D and T, there are formed diffracted waves DD and TD and transmitted waves DT and TT after the second transit. As a result, there emerges from the transmission grating, two waves DT and TD traveling in a direction antiparallel to the incident radiation and two waves DD and TT traveling at an angle. It can be shown, however, that at each diffraction diffracted waves suffer a phase retardation of $\pi/2$ relative to the transmitted waves. Consequently, waves DD and TT are out-of-phase by 180 degrees and cancel each other while waves DT and TD are in-phase.

Preferably, the hologram has a diffraction efficiency, which is the percentage of incident power that is diffracted, that is approximately the same as the transmission efficiency, which is the percentage of incident power that is transmitted. Consequently, the amplitudes of the diffracted wave and the transmitted wave are nearly the same, and the out-of-phase waves DD and TT cancel completely. Where there is little or no absorption in the hologram, as is the case with phase holograms, such complete cancellation is achieved when the diffraction and transmission efficiencies are each approximately 50 percent. Consequently, substantially all the radiation incident on the hologram at the Bragg angle is returned in waves DT and TD traveling in a direction antiparallel to the incident radiation. However, radiation that is not incident at the Bragg angle, for example, radiation having a wavelength different from the wavelength that satisfies the Bragg angle, is for the most part not diffracted by the hologram grating and is reflected by the reflective layer away from the direction of the incident beam. Accordingly, the combination of hologram and reflective layer acts as a wavelength selective reflector.

It will be apparent to those skilled in the art that our invention can also be practiced where the diffraction and transmission efficiencies are not equal and the amplitude of the diffracted wave does not equal the amplitude of the transmitted wave. In such a case, cancellation will not be complete and some of the radiation incident at the Bragg angle will be lost in waves DD and TT. However, to the extent that this loss can be tolerated, our invention can be operated. Indeed, if very large radiation losses can be borne, our invention can even be practiced with absorption holograms despite their low diffraction efficiency.

Details on the formation of holograms of a desired efficiency over a wide range of wavelengths may be found in H. Kogelnik's paper, "Coupled Wave Theory for Thick Hologram Gratings," Bell System Technical Journal, vol. 48, No. 9, page 2909 (November 1969) where Equation 45 summarizes the relevant parameters.

As indicated, waves DD and TT should also be directed at substantially the same angle. This requires a structure that reflects the transmitted wave T in a direction parallel to that of the twice diffracted wave DD. One such structure is, of course, that in which the contours of maximum (or minimum) optical path length are substantially perpendicular to the reflective layer. This structure also returns the once diffracted waves DT and TD in a direction antiparallel to the incident beam.

The separation between waves DT and TD is related to the distance between the front surface of the hologram and the reflective layer located behind its rear surface. In our practice of the invention this distance has been approximately twelve microns; but clearly other distances can be used whenever other separations between the waves are acceptable. If desired, the hologram and the reflective means may also be separate units. While this arrangement is not preferred because it is more complicated, it will work so long as the reflective means is close enough to the hologram that it reflects back to the hologram substantial parts of both the transmitted and diffracted radiation to form waves with an acceptable separation.

Figure 4:
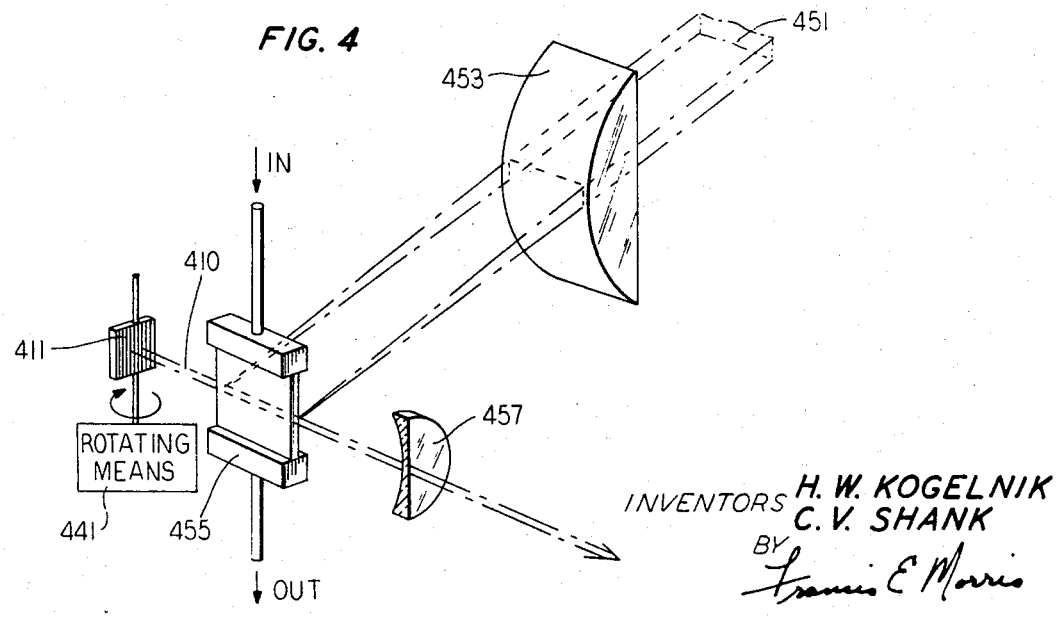
FIG. 4 is a schematic illustration of our invention as used in tuning a dye laser.

Our combination of a hologram and reflective means is useful in numerous instances where a wavelength selector is desired. For example, the combination can be used as a wavelength selector in a spectrometer or a monochromator using the Littrow configuration. We have found it most useful as a wavelength selector with a dye laser. Such apparatus is shown in FIG. 4 and comprises a cavity defined by a spherical mirror 457 and the combination 411 of a thick transmission hologram and reflective means, means 441 for rotating combination 411 to change the angle at which radiation is incident on the contours of the hologram, a cell 455 through which flows the dye that is the active laser medium, and a beam of radiation 451 and a cylindrical lens 453 for optically pumping the active medium. To operate the dye laser, dye is pumped through cell 455 and an intense beam 451 derived, for example, from a second laser that is not shown, is directed at a portion of the dye cell. In this region lasing action takes place, and a beam of radiation 410 is generated along the axis of the cavity. This radiation is incident on the combination 411 of hologram and reflective means. As indicated above, the hologram is wavelength selective and returns in the direction antiparallel to the incident radiation only radiation incident at the Bragg angle. Consequently, the output of the dye laser cavity is confined to a narrow band of wavelength. In practice, we have observed that this band is approximately 0.5 A.

The particular output of the cavity can be tuned simply by rotating the hologram by means 441 so as to change the angle at which radiation is incident on the contours of maximum (or minimum) optical path length in the hologram. By so changing the angle, the wavelength that satisfies the Bragg condition is changed. Consequently, the wavelength of the output of radition from the cavity is also changed.

As will be apparent to those skilled in the art, numerous modifications can be made to the above apparatus within the spirit and scope of our invention. For example, many other hologram recording materials can be used and the details of the hologram recording process can be varied. The angle α and the particular wavelength at which the hologram grating is formed are limited only by the capability of the recording medium to record the interference fringes that are formed and the fact that the recorded fringe spacing does affect the diffraction efficiency of the hologram. Similarly, if desired, the hologram recording can be comprised of a set of non-planar surfaces of maximum (or minimum) optical path length. By using well-known holographic techniques, holograms of this type can be made to focus the reflected radiation.

It is also possible to form the combination of hologram and reflective means in ways other than that described above. For example, the recording medium may be a layer located on top of a highly reflective layer on a substrate. If the reflective layer transmits radiation of the wavelength used in forming the holograms, then there will be no reflection from this layer to interfere with the recording of the hologram in the recording medium. Alternatively, if the recording medium is relatively opaque to radiation of the wavelength used in forming the hologram, then little incident radiation will ever reach the reflective layer or be reflected back into the recording medium. In dichromated gelatin this can be accomplished by increasing the percentage of dichromate in the gelatin enough that little radiation reaches the reflective layer.

As will be apparent to those skilled in the art, our invention may be used over an extremely broad range of wavelengths and is by no means limited to a particular band of radiation such as the infrared, the visible or the ultraviolet. Obviously, however, the particular recording medium and the particular reflective means used may have to vary if our invention is operated at widely separated wavelengths.

Numerous variations can also be made in the apparatus of FIG. 4. For example, to further reduce radiation losses, the hologram and reflective means can be inserted into cell 455; and to vary the angle at which radiation is incident on the hologram, acousto-optic or electro-optic deflectors can be substituted for rotating means 441.

Still other arrangements that vary within the spirit and scope of our invention may be devised by those skilled in the art.

What is claimed is:

1. A filter comprising a thick transmission hologram and a reflective means, said reflective means having a planar surface and being of a type which reflects in an anti-parallel direction any incident light that is perpendicular to the planar surface, said hologram comprising variations in transmittance or optical path length with contours of maximum (or minimum) transmittance or optical path length, said contours contacting the planar surfaces of the reflective means and being substantially perpendicular to the planar surface, said variations being oriented with respect to the reflective means so that, for different angles at which radiation is incident on the hologram, the direction of some radiation from the filter remains constant with respect to the direction of radiation incident on the hologram.

2. The filter of claim 1 wherein the thick transmission hologram is a phase hologram.

References Cited

UNITED STATES PATENTS

| 3,507,564 | 4/1970 | Franks | 350—162 R |
| 3,578,845 | 5/1971 | Brooks et al. | 350—162 R |

OTHER REFERENCES

Denisyuk, On the Reproduction of the Optical Properties of an Object by the Wave Field of Its Scattered Radiation. Optics and Spectroscopy, vol. 15, No. 4 (October 1963), pp. 279-284.

Gerharz, Optical Lattice Filters From the Wave Field of Laser Radiation. Proc. IEEE (May 1963), pp. 862 and 863.

Born et al., Principles of Optics, 2nd ed., MacMillan Co., 1964 (Sci. Lib. Call No. QC357.B57), p. 280.

Sears, Optics, Addison-Wesley Pub. Co., Inc. (1958), pp. 211-213.

WILLIAM L. SIKES, Primary Examiner

U.S. Cl. X.R.

331—94.5; 350—3.5